United States Patent [19]

Pfau et al.

[11] 4,314,133
[45] Feb. 2, 1982

[54] PROCESS AND APPARATUS FOR ELECTRICAL DISCHARGE MACHINING BY MEANS OF A WIRE ELECTRODE

[75] Inventors: Jean Pfau, Collonge-Bellerive; Alain Wavre, Geneva, both of Switzerland

[73] Assignee: Ateliers des Charmilles S.A., Geneva, Switzerland

[21] Appl. No.: 119,549

[22] Filed: Feb. 7, 1980

Related U.S. Application Data

[63] Continuation-in-part of Ser. No. 843,431, Oct. 19, 1977, abandoned.

[51] Int. Cl.³ .................................................. B23P 1/12
[52] U.S. Cl. ............................ 219/69 M; 219/69 W
[58] Field of Search .............. 219/69 W, 69 M, 69 G, 219/69 C

[56] References Cited

U.S. PATENT DOCUMENTS 3,943,322  3/1976  Lehmann et al. ............... 219/69 W
4,081,652  3/1978  Jänicke et al. .................. 219/69 W

FOREIGN PATENT DOCUMENTS 2502288  8/1976  Fed. Rep. of Germany.

Primary Examiner—C. C. Shaw
Attorney, Agent, or Firm—Hauke and Patalidis

[57] ABSTRACT

A method and apparatus for cutting a workpiece by electrical discharges by means of a travelling wire electrode according to a path determined by a numerical control program without reducing the machining speed or the current flowing into the wire electrode. At least one of the support and guiding members of the wire electrode is displaced relative to the workpiece along a path resulting from shifting each point of the desired cutting path a predetermined distance in the direction of machining along a tangent to each point of such path. The angle between the tangent at each point of the path relative to the coordinate axes is determined, and each point of the path is shifted relative to the programmed path along coordinates having values proportional respectively to the sine and cosine of the angle.

5 Claims, 6 Drawing Figures

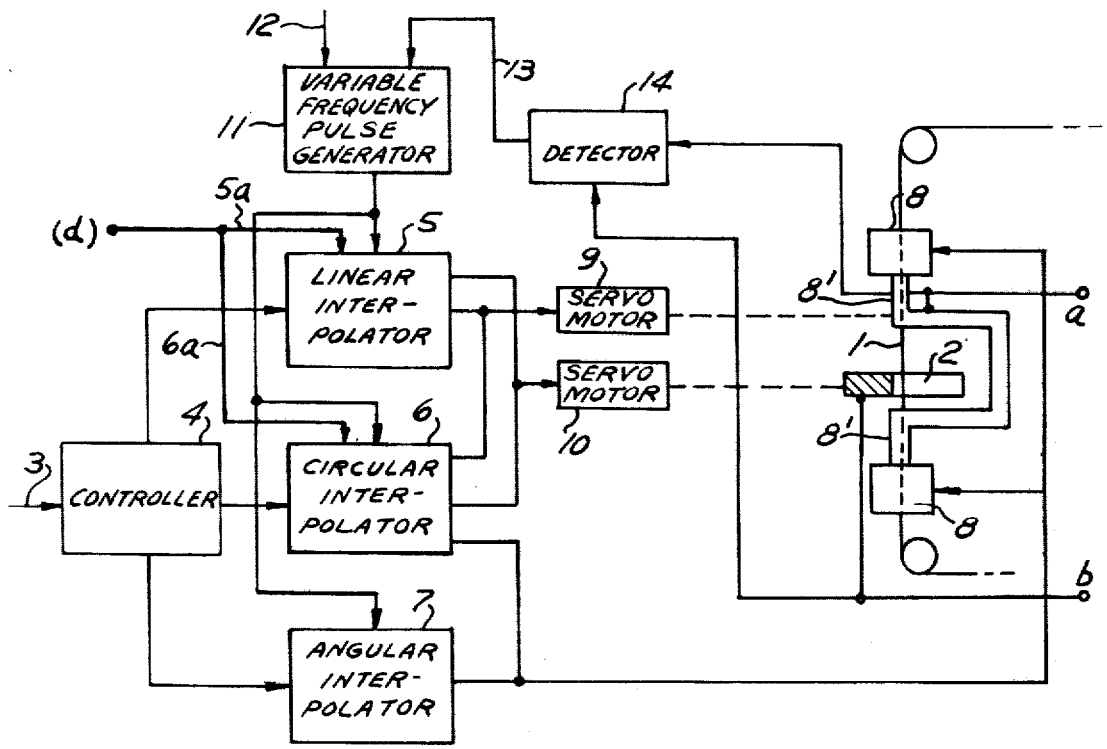
FIG. 1
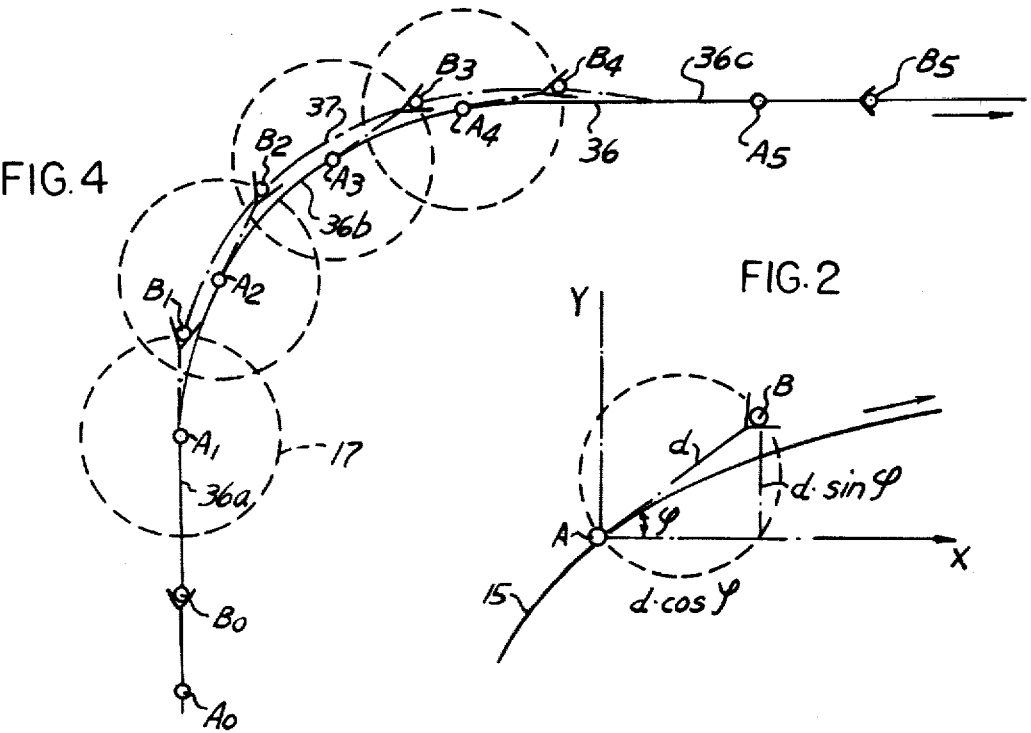
FIG. 4
FIG. 2

4,314,133

PROCESS AND APPARATUS FOR ELECTRICAL DISCHARGE MACHINING BY MEANS OF A WIRE ELECTRODE

CROSS-REFERENCE TO RELATED APPLICATIONS

The present application is a continuation-in-part of application Ser. No. 843,431, filed Oct. 19, 1977, now abandoned.

BACKGROUND OF THE INVENTION

The present invention relates to a method and apparatus for machining an electrode workpiece by EDM by means of a travelling wire electrode continuously supplied between appropriate support and guiding members, the motion of one electrode relative to the other being controlled in such manner as to cut a predetermined path in the workpiece.

During such a machining operation, when the wire electrode cutting path in the workpiece is subjected to a sharp change of direction, there is generally a considerable error between the trajectory or path obtained in the workpiece and an ideal or programmed trajectory or path. The error is caused principally by the resultant of the forces acting on the wire electrode in the course of the machining operation, such resultant of the forces causing the active portions of the wire electrode to be no longer stretched as a straight line between its support and guiding members. The misalignment of the electrode wire relative to its support and guiding members may, for example, be of the order of 4/100 mm for a workpiece having a height of 70 mm. The method and apparatus disclosed in U.S. Pat. No. 4,081,652, assigned to the same assignee as the present application, permits to partially compensate for the error by varying the machining speed as a function of the curvature of the path. Such an arrangement, however, results in slowing down the machining speed when the path cut in the workpiece by the wire electrode has a substantial amount of curvature.

Another method, disclosed in Published German patent application No. 2,502,288, consists in passing through the wire electrode an auxiliary electrical current creating a magnetic field exerted in an opposite direction to the magnetic field resulting from the electrical discharges circulating through the wire electrode. Such a method cannot be used with wire electrodes of very small diameter because the density of the auxiliary current is too high to permit passing an effective machining current through the electrode wire.

The present invention permits to eliminate, for all practical purposes, the shortcomings and inconveniences of the methods and apparatus mentioned hereinbefore, and it permits to obtain a machining path exactly conforming to the machining path determined by a program, without decreasing the machining speed or the current supplied to the travelling wire electrode.

SUMMARY OF THE INVENTION

The present invention accomplishes its purpose by displacing at least one of the support and guiding members of a travelling wire electrode relative to the workpiece, along a corrected path obtained as a result of displacing each point of the programmed path, in the same direction as the direction of cut, a predetermined distance along a tangent to any given point of the programmed cutting path. The present invention has applications to EDM machines provided with a numerical control input as well as to EDM machines provided with a template or model duplicating device.

BRIEF DESCRIPTION OF THE DRAWING

The accompanying drawing illustrates, schematically and for illustrative purposes only, two structural embodiments of an apparatus for practicing the method of the present invention. In the accompanying drawing:

FIG. 1 is a block diagram of a circuit for controlling the relative displacement of the electrodes of an EDM machine, according to the present invention;

FIG. 2 represents a diagram illustrating the principles of the present invention as applied to the correction of a curved cutting path of a travelling wire electrode through a workpiece;

FIG. 4 is a schematic diagram useful in explaining the operation of the structure of FIG. 3 while cutting in the workpiece a curved path;

DETAILED DESCRIPTION OF THE PREFERRED EMBODIMENTS

Figure 3:
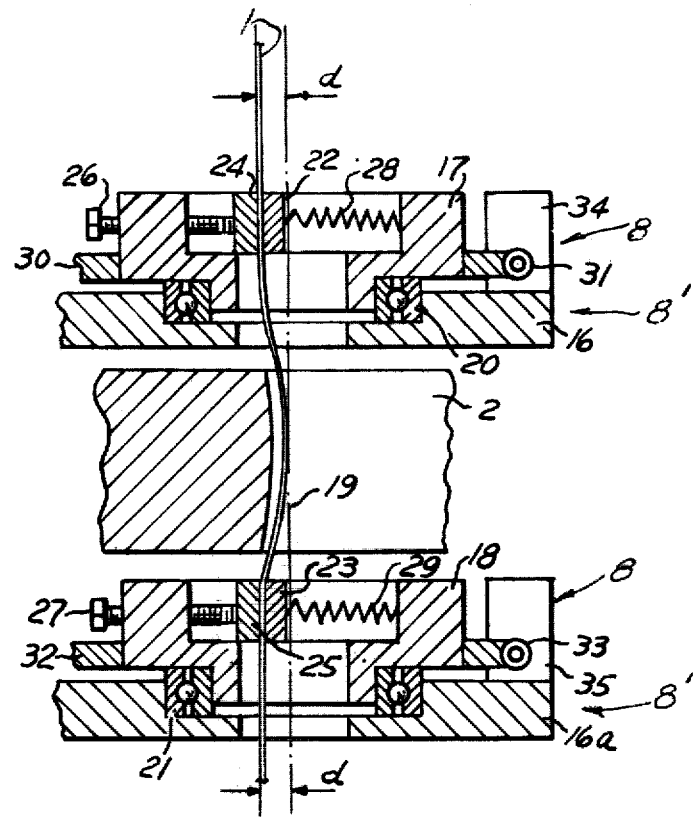
FIG. 3 represents a section through a travelling wire electrode support and guide member according to the invention.

FIG. 1 illustrates a simplified schematic block diagram of an arrangement for controlling the relative motion between a travelling wire electrode 1 and an electrode workpiece 2 in an EDM apparatus provided with a numerical control of the step-by-step relative displacement of the electrodes, for effecting a cut through the workpiece along a programmed path.

The coded information defining the desired cutting path is supplied on a line 3 to a controller 4. The controller 4, in a manner well known in the numerical control art, drives three interpolation circuits 5, 6 and 7, the interpolation circuit 5 being a linear interpolar controlling the linear portions of the cutting path, the interpolation circuit 6 being a circular interpolar controlling the circular portions of the cutting path, and the third interpolation circuit 7 being an angular interpolator controlling the angular position of a compensating element 8 for the position of the travelling wire electrode 1. The function of the angular interpolator 7 is to provide a shift of the position of the electrode wire 1 eccentrically relative to its designated position as commanded by the numerical control input data information. The pulses controlling the machining feed are supplied by the linear interpolator 5 and the circular interpolator 6 respectively to stepping servo-motors 9 and 10 which, in turn, control respectively the position of the support and guide members 8' of the electrode wire 1 relative to the electrode workpiece 2 along two coordinate axes, an X-axis and a Y-axis. The servo motor 9 displaces, for example, the support and guide members 8' for the electrode wire 1 along the X-axis, and the servo motor 10 displaces the electrode wire support and guide members 8' along the Y-axis. Alternatively, the electrode wire support and guide members 8' may be mounted stationary and the electrode workpiece 1 mounted on a cross-slide table displaced along the two coordinate X- and Y-axes, respectively by the servo-motor 9 and the servo-motor 10 or, one of the two servo-motors 9 or 10 may be used to displace the workpiece 2 along one axis and the other servo-motor used to displace the electrode wire support and guide members along the other axis. The machining pulses are applied between the terminals a and b by a pulse generator, not shown, as is well known in the EDM art.

The compensating elements 8 are controlled by the angular interpolator 7 for providing the machined workpiece 2 with a draft angle, by the circular interpolator 6 for displacing the cutting path of the wire electrode 1 relative to the cutting path defined by the numerically coded data representing the programmed path when the programmed path is circularly curved, and by the linear interpolator 5 when the programmed path is non-circularly curved or subject to a sudden change of direction.

The three interpolator circuits 5, 6 and 7 supply command signals for the relative position of the electrodes at a frequency depending from the machining conditions by means of variable frequency pulses supplied by a pulse generator 11. The variable frequency pulse generator 11 is supplied from a clock, not shown, by a line 12 with pulses of constant frequency which are modulated by a signal supplied by a line 13 from a detector circuit 14 as a function of the electrical discharge machining conditions in the gap between the electrode wire 1 and the workpiece 2.

The corrected cutting path resulting from the relative motion of the electrodes is obtained directly from the linear interpolator 5 or from the circular interpolator 6, and the angular interpolator 7 is used for controlling the position of at least one of the electrode wire support and guide members 8' such as to provide a predetermined draft angle on the totality of the surface machined on the workpiece. The linear and the circular interpolators 5 and 6 control the relative displacement of the electrodes according to the programmed cutting path, and the correction of the path is obtained by means of the structure illustrated at FIG. 3, under the control of command signals obtained from the linear interpolator 5 or the circular interpolator 6.

FIG. 2 illustrates the principles for correcting a curved programmed path 15. When the travelling wire electrode is positioned at a point A along the programmed desired path 15, the support and guide members for the wire electrode are in the position B as a result of a misalignment d between the actual position of the electrode wire and the position of its support and guide members, the misalignment being caused by the forces acting upon the wire electrode. Consequently, the programmed position of the wire electrode must be displaced relative to each point of the path 15 of a distance d in a direction AB tangent at point A to the path 15. If the tangent AB forms an angle $\phi$ with one of the coordinate axes, for example the X-axis, the correction to be effected on the two coordinate axes at the point A of the path 15 has respectively a value proportional to the cosine and to the sine of the angle $\phi$.

According to a first aspect of the invention, the correction factors are calculated by the linear and circular interpolators 5 and 6 of FIG. 1, which receive, respectively through lines 5a and 6a, a coded signal representing the misalignment d, such correction factors being represented by $d \cdot \sin \phi$ and $d \cdot \cos \phi$. As, for a specific operation, the misalignment d is a known constant depending upon the force of tension of the travelling wire electrode between its support and guide members, the intensity of the machining current and the thickness of the workpiece, the correction coded signal applied through the lines 5a and 6a respectively to the linear interpolator 5 and circular interpolator 6 is a constant proportional to d.

According to a second aspect of the invention, the correction of the position of the wire electrode is obtained via the support and guiding members 8' of the wire electrode 1, according to the structure illustrated at FIG. 3. The support and guiding members 8' for the electrode wire 1 consist of the support 16 and 16a, mechanically interconnected such as to be displaced along an axis, X- or Y-axis, in unison by means of the servo-motor 9, FIG. 1, while the workpiece is displaced along the other axis by means of the servo-motor 10. The support 16 carries a rotatable plate 17, and the support 16a carries a rotatable plate 18, each of the plates 17 and 18 being rotatably supported by its respective support about an axis 19 by means of ball bearings 20 and 21, respectively. The plate 17 supports a slide 22, while the plate 18 supports a slide 23, the slides 22 and 23 being in turn provided with guide surfaces 24 and 25, respectively, guiding the wire electrode 1 and each arranged such as to be adjustably slidable radially relative to its respective plate 17 or 18 by means of a micrometer screw 26 or 27, respectively. A compressed spring 28 or 29, respectively, is used for urging its corresponding guide against the end of the appropriate adjusting screw. The distance d separating the axis of the electrode wire 1 from the axis of rotation 19 of the plates 17 and 18 is arbitrarily chosen, for example, as a function of the average distortion of the wire electrode relative to the height of the workpiece 2. The distance d is entered manually by setting the micrometer screws 26 and 27 such as to position the guide surfaces 24 and 25 eccentrically ahead of the axis 19 of rotation of the plates 17 and 18 of that distance d. The plate 17 is rotatably driven by means of a geared wheel 30 driven by a screw 31 on the output shaft of an electric motor 34, the plate 18 being rotatably driven by means of a geared wheel 32 meshing with a screw 33 mounted on the output shaft of an electric motor 35. The two motors 34 and 35 are controlled by command signals obtained from the interpolators 5–7, and therefore represent the element 8 of FIG. 1.

FIG. 4 illustrates different positions of the plates 17 and 18 corresponding to a programmed path 36. The programmed path 36 comprises a rectilinear portion 36a, followed by a curved portion 36b, in turn followed by a further linear portion 36c. While cutting the linear portion 36a of the programmed path 36, such as when cutting at point $A_0$, the wire electrode is subjected at its cutting portion to a rearward deviation relative to the position of the wire electrode support and guide members which corresponds to the misalignment d, FIG. 3, such that the wire electrode is supported between the support and guide members occupying the position $B_0$, the distance $A_0B_0$ being equal to the misalignment d. At point $A_1$, the path 36 changes from the linear path 36a to the curved path 36b, in order for the wire electrode to occupy the position $A_1$, the wire electrode guiding member must take the position $B_1$, which is aligned with the rectilinear portion of the path 36, the distance $A_1B_1$ being equal to the misalignment d, FIG. 3, of the wire electrode relative to its support and guide members during electrical discharge machining.

For each consecutive point $A_1$, $A_2$, $A_3$, and $A_4$ of the curved path 36b the wire electrode support and guide members must take consecutively the positions $B_1$, $B_2$, $B_3$, and $B_4$, in directions which are tangent to the curved path 36b at each point $A_1$, $A_2$, $A_3$, and $A_4$. As a result the wire electrode guide member plates 17-18 must be eccentrically rotated around the axis 19, FIG. 3. The wire electrode support members are thus caused to follow a corrected path 37 which is different from the programmed curved path 36b. The misalignment d remains constant all through the progression of the cut through the programmed curved path 36b. While the wire electrode occupies successively the positions $A_1$, $A_2$, $A_3$ and $A_4$ the portion of the wire electrode supported by the support and guide members correspondingly occupies successively the positions defined by the points $B_1$, $B_2$, $B_3$ and $B_4$ along the corrected curved path 37. $A_1B_1 = A_2B_2 = A_3B_3 = A_4B_4 = d$, and the angle $\phi$ formed by tangent lines $A_1B_1$, $A_2B_2$, $A_3B_3$, $A_4B_4$ with the X-axis is determined as a function of its sine and cosine, either by the linear interpolator 5 or by the circular interpolator 6, FIG. 1, which, in addition to simultaneously controlling the servo-motors 9 and 10 differentially to effect the curved path cut in the workpiece as programmed control the servo-motors 34 and 35 which in turn rotate the electrode support and guide member plates 17-18 an appropriate angle proportional to the angle $\phi$ as defined by the correction factors $d \cdot \sin \phi$ and $d \cdot \cos \phi$. As is well-known in the numerical control art, a single bit of coded input data information is required by the circular interpolator 6 for controlling a circular path, while a plurality of bits is required by the linear interpolator 5 for controlling a non-circular curved path, and the curved path co-ordinates are determined by the circular or linear interpolator according to whether the curved path is circularly curved or non-circularly curved.

After the curved path has been effected, the support and guide members are returned to their original position allowing the wire electrode to cut the straight portion 36c of the path, the programmed path and the corrected path coinciding once again.

Figure 4A:
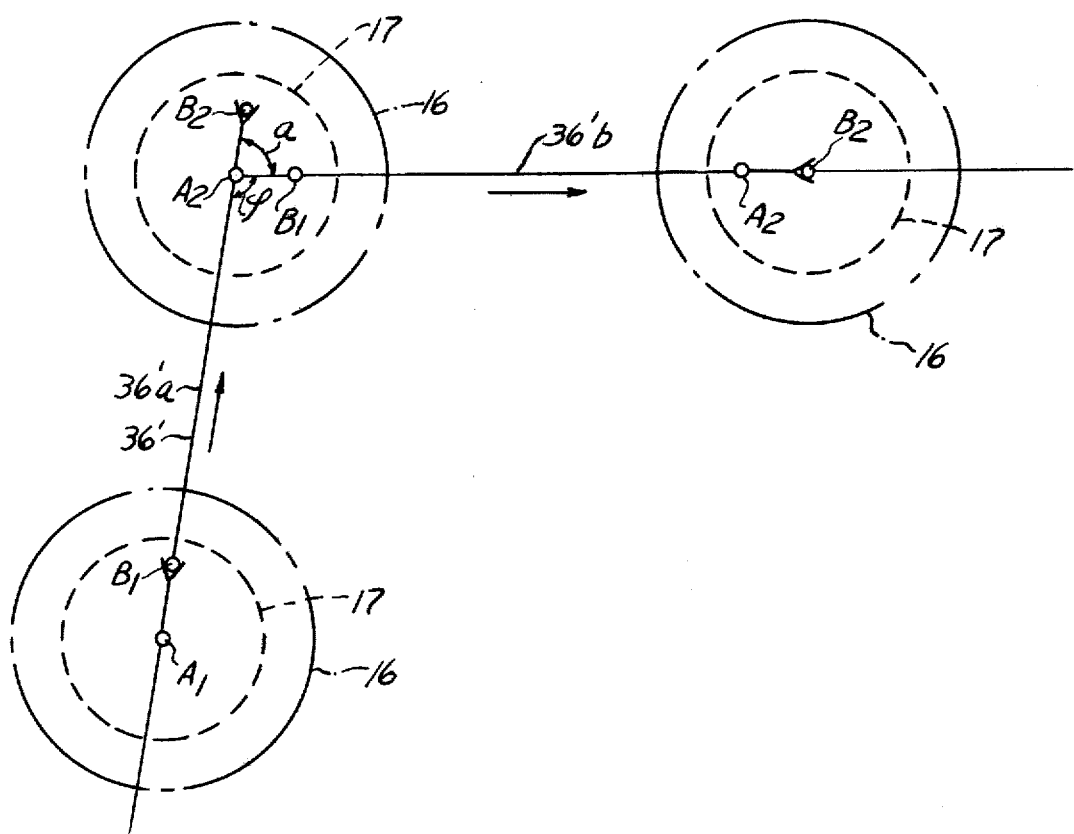
FIG. 4(a) is a schematic diagram illustrating the operation of the structure of FIG. 3 while cutting in the workpiece a linear path subject to an abrupt change of direction.

More particularly, when the programmed cutting path is subjected to a sharp angular change of direction, the wire electrode support and guide members must effectuate a rapid angular positioning of equal angular value. FIG. 4(a) illustrates the principles of the invention for effecting such a rapid angular positioning of the wire electrode support and guide members when a straight programmed cutting path 36' is subjected to a sharp angular change of direction. The programmed path 36' consists of a first straight portion $36_a'$ during which the wire electrode support and guide members occupy diverse successive positions such as point $B_1$, while the cutting portion of the wire electrode occupy successive positions such as point $A_1$, the distance $A_1B_1$ being equal to the misalignment d. The programmed path and the actual path coincide. The wire electrode support and guide members mounted on the rotatable plate 17 therefore precede by the distance d the axis of rotation of the rotatable plate 17, corresponding to the centerline 19 of FIG. 3. At point $A_2$ the straight cutting path $36_a'$ is subjected to a sharp angular change of direction. However, the wire electrode support and guide member is positioned at point $B_2$, and in order for the wire electrode to cut the subsequent straight path $36_b'$, the rotatable plate 17 must be rotated relative to the support plate 16 of an angle a which, in the example of illustration at FIG. 4(a), is equal to 180°$\phi$, being the angle of the path relative to the X-axis as previously defined. The control of the angular positioning or rotation of the wire electrode support and guide member plates 17-18 relative to the support plates 16-16a is normally provided by the linear interpolator 5 of FIG. 1 simultaneously with the control of the position of the rotation axis 19 of the support and guide member plates 17-18, or the position of the support plates 16-16a. Alternatively, in installations provided with an angular interpolator 7, as illustrated at FIG. 1, the angular interpolator 7 may be used to control the simultaneous rotation of the plates 17-18 in the same direction of the same amount while the control of the displacement and position is effected by the linear interpolator 5. A single bit of information from the numerical control of the apparatus is required for effecting the appropriate corrections of the programmed path.

Figure 5:
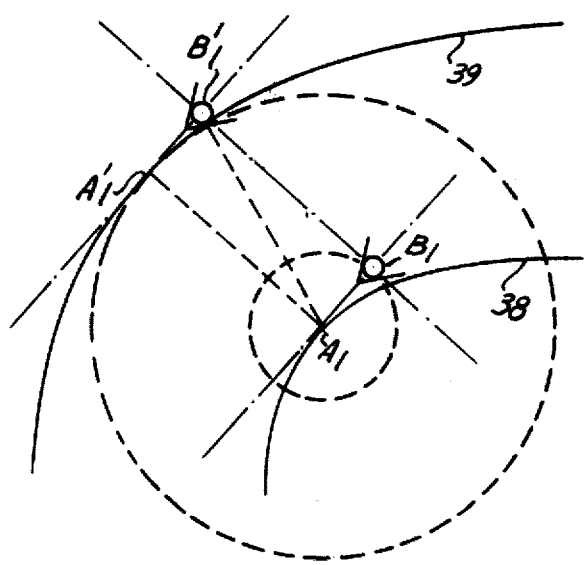
FIG. 5 is a diagram relating to the operation of the present invention with respect to a specific machining operation for cutting a workpiece with a draft angle.

FIG. 5 illustrates diagrammatically an application of the present invention to the particular conditions resulting from providing the machined surface on the workpiece with a predetermined draft angle. Curve 38 represents the programmed machining path. The lower wire electrode support and guide member occupies the position $B_1$ corresponding to the point $A_1$ of the path 38, $A_1B_1$ being equal to d. In order to obtain the desired draft angle, the wire electrode upper support and guide member occupies the position $B_1'$ in a direction perpendicular to a tangent at point $A_1$ to the path 38, such that the plane in which the distorted wire electrode is situated is tangent at point $A_1$ to the path 38 and is tangent at point $A_1'$ to a path 39 parallel to the path 38. The distance separating the two wire electrode support and guiding members, as projected on a single plane, and that distance has a value which is correlated to the desired draft angle.

The position at points $B_1'$ of the wire electrode upper support and guide member relative to the point $A_1$ of the path 38 is obtained by a first shifting $A_1B_1$ equal and in the same direction as the shifting of the wire electrode lower support and guide member, to which is added a second shifting $B_1B_1'$ in a direction perpendicular to the direction of first shifting, the amount of second shifting being chosen as a function of the draft angle.

The draft angle may be included in the program data fed into the controller 4, FIG. 1, or it may be in the form of a manually inserted input constant applied to the controller. The draft angle information data is fed by the controller 4 to the angular interpolator 7 for rotating one of the electrode wire support and guide member plates 17 or 18 by means of one of the servo motors 34 or 35 in an appropriate direction, while the other support and guide member plate 17 or 18 is rotated in an opposite direction, such that one of the electrode wire support and guide members occupy the position $A_1$ while the other occupies the position $A_1'$, thus being laterally shifted one relative to the other.

What is claimed as new is as follows:

1. A method for machining by electrical discharges an electrode workpiece by means of an electrode wire fed longitudinally between two wire support and guide members, wherein the motion of the electrodes one relative to the other along a pair of coordinate axes is controlled in such a manner as to cut in the workpiece a desired path of predetermined shape and wherein said electrode wire is subjected to deformation during machining causing a displacement of the cutting path relative to said desired path in a direction generally opposite to the direction of said path, said method comprising displacing relative to the workpiece at least one of the electrode wire support and guide members along a corrected path obtained by shifting each point of the desired cutting path in the direction of the cutting path a predetermined distance corresponding to said displacement along a tangent at said point to said cutting path.

2. An apparatus for machining by electrical discharges and electrode workpiece by means of an electrode wire fed longitudinally between two wires support and guide members, wherein the motion of the electrodes one relative to the other along a pair of coordinate axes is controlled in such a manner as to cut in the workpiece a desired path of predetermined shape and wherein said electrode wire is subjected to deformation during machining causing a displacement of the cutting path relative to said desired path in a direction generally opposite to the direction of said path, said apparatus comprising means for controlling the relative displacement of the wire electrode support and guide members and of the workpiece according to the desired cutting path, said means comprising means for determining a tangent at each point of said path, and means for shifting at each said point the position of at least one of the electrode wire support and guide members relative to the electrode workpiece of a predetermined distance corresponding to said displacement along said tangent in the direction of the cutting path.

3. The apparatus of claim 2 further comprising means for determining the angle between said tangent and each of said pair of coordinate axes, and means for shifting each point of said path to a second point whose coordinates relative to each said coordinates are said distance corresponding to said displacement multiplied respectively to the sine and cosine of said angle.

4. The apparatus of claim 2 further comprising means for pivoting at least one of said wire electrode support and guide member around an axis parallel to said wire electrode, said means comprising means for shifting said support and guide member from said axis by said predetermined distance, and means for orienting said member relative to said axis in said direction for each point of said path.

5. The apparatus of claim 4 wherein the second of said wire electrode support and guide member is shifted both in said direction by said first predetermined distance and in a direction perpendicular to said first direction by a second predetermined distance different from said first distance.

* * * * *